A. E. BUCHENBERG.
CONTROL FOR DYNAMO ELECTRIC SYSTEMS.
APPLICATION FILED MAY 13, 1918.
1,398,064.
Patented Nov. 22, 1921.
Fig. I.
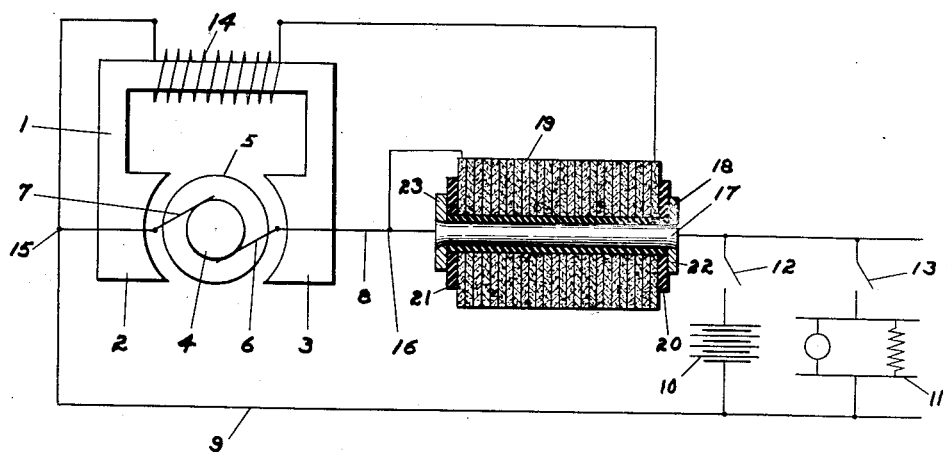
Fig. II.
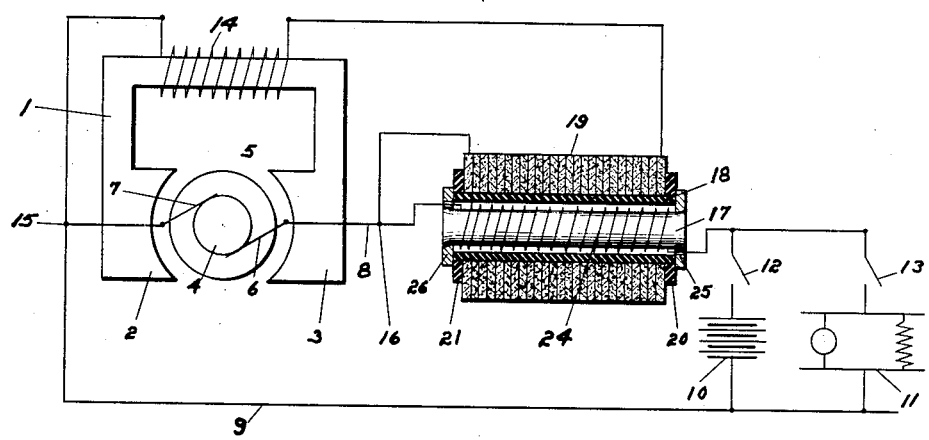
Inventor
Alvin E. Buchenberg
By Chester H Brasetton
Attorney

UNITED STATES PATENT OFFICE.

ALVIN E. BUCHENBERG, OF TOLEDO, OHIO, ASSIGNOR TO ELECTRIC AUTO-LITE CORPORATION, OF TOLEDO, OHIO, A CORPORATION OF DELAWARE.

CONTROL FOR DYNAMO-ELECTRIC SYSTEMS.

1,398,064.      Specification of Letters Patent.      Patented Nov. 22, 1921.

Application filed May 13, 1918. Serial No. 234,206.

*To all whom it may concern:*

Be it known that I, ALVIN E. BUCHENBERG, a citizen of the United States, residing at Toledo, in the county of Lucas and State of Ohio, have invented certain new and useful Improvements in Controls for Dynamo-Electric Systems, of which I declare the following to be a full, clear, and exact description.

This invention relates to a method of control for dynamo electric systems, having particular applicability in charging and lighting systems for automobiles and the like.

The principal object of the invention is to provide controlling means for a dynamo electric machine, which will prevent the voltage of the system from rising above a given predetermined maximum independently of any variations in the speed rotation of the armature of the machine.

Another object is to provide a type of regulation which is compact in size and rugged in construction.

Further objects, and objects relating to economies of manufacture and details of construction, will definitely appear from the detailed description to follow.

I accomplish the object of my invention by the devices described in the following specification.

Structures constituting certain embodiments of my invention are illustrated in the accompanying drawing, forming a part of this specification, in which:

Figure I is a diagrammatic drawing showing the regulating device properly connected in a charging and lighting system, and Fig. II is a similar drawing showing a modified form of regulating device.

In the drawings, similar reference numerals refer to similar parts throughout the several views.

In the system illustrated, I employ a dynamo electric machine 1, which, for ease of description, is in the form of a bi-polar generator, having field poles 2 and 3. Bearing upon the commutator 4 of the armature 5, are main brushes 6 and 7 and to these main brushes are connected the service mains 8 and 9. A storage battery 10, and translating devices 11 are connected through the switches 12 and 13 across the mains 8 and 9.

I employ a shunt field winding 14 of ordinary construction, one terminal of which is connected to the main brush 7 at the point 15 and the other terminal of which is connected to the brush 6 at the point 16.

The regulating device proper is formed on a metallic rod 17, upon which is an insulating sleeve 18. A series of carbon disks 19, appropriately apertured, are placed over the insulating sleeve 18 in such a number that when the insulating washers 20 and 21 and the terminal washers 22 and 23 are in position on the ends of the rods, the whole carbon pile is fixed securely in compressed formation.

This regulating device as above described is, inserted in the system in such a way that the connecting rod 17 is in series with the service main 8, and the carbon piles 19 are in series with the shunt field 14. The rod 17 in the regulating device is a metal which has a high co-efficient of thermal expansion and which also has comparatively high specific resistance so that when current is passed through the rod to an appreciable amount, the resulting heating effect will cause a linear expansion of the rod, thereby lessening the compression upon the carbon disks 19. This will increase the resistance of the carbon disks to the passage of current of the shunt field, and in consequence, the current in the shunt field will be reduced.

The application of this method of control to a variable speed generator, such as is used on automobiles for charging and lighting purposes, is particularly desirable, inasmuch as the voltage is maintained at safe limits, even for the higher engine speeds.

In Fig. II, I have shown a modification of the controlling apparatus, wherein, instead of utilizing the holding rod 17 for the purpose of conducting current from the main 8, I employ a heating coil 24, which is in series with the service main 8, and is coiled around the rod 17. The insulation sleeve 18, in this case, is made of a diameter comparatively greater than that in the first form, so as to permit ready assemblage. The terminal washers 25 and 26 are apertured so as to permit insertion of the conductors therethrough.

The operation of the modified control is similar in effect to the first described form, in that, as the current increases in the main circuit, the heating effect on the rod 17 is increased, thereby lessening the pressure on the carbon disks, and increasing the resistance in the shunt field circuit.

I am aware that the particular embodiment of my invention, here shown and described, is susceptible of considerable variation without departing from the spirit of my invention, and, therefore, I desire to claim the same broadly, as well as specifically, as indicated by the appended claims.

Having thus described my invention, what I claim as new and desire to secure by Letters Patent, is:

1. In a regulator, the combination of a series of contiguous carbon plates, a controlled circuit connected therewith, a metallic member for binding said plates together, a controlling circuit and means whereby the current in said controlling circuit is caused to heat said metallic member to thereby release the pressure on said plates.

2. In a regulator, the combination of a series of contiguous carbon plates, a controlled circuit connected to certain of said plates, a metallic member for binding said plates together, a controlling circuit connected to heat said member thereby causing it to expand and increasing the resistance of said series of plates.

3. In a regulator, the combination of a series of contiguous carbon plates, a controlled circuit connected to the first and last plates of said series, a metallic rod having a pair of end plates for binding said carbon plates together, said carbon plates being insulated from said rod and end plates, and a controlling circuit for heating said rod in accordance with the current traversing said circuit whereby the rod expands and the resistance between the carbon plates is increased.

4. In a regulator, the combination of a series of carbon disks, a metallic rod having end heads for binding said plates together, insulation between said plates and said rod, a controlled circuit connected to the end plates of said series and a separate controlling circuit associated with said rod to heat the same in accordance with the current therein whereby as the current in said controlling circuit increases the current in said controlled circuit decreases.

5. In a regulator, the combination of a series of carbon disks, a rod having end heads for binding said plates together, said plates being insulated from said rod and end heads, a circuit connected to be controlled by said series of disks, a resistance winding for said rod, and a controlling circuit connected to said winding whereby the resistance offered to said controlled circuit increases in response to an increase in current in said controlling circuit.

In testimony whereof, I affix my signature.

ALVIN E. BUCHENBERG.